Figure 1:
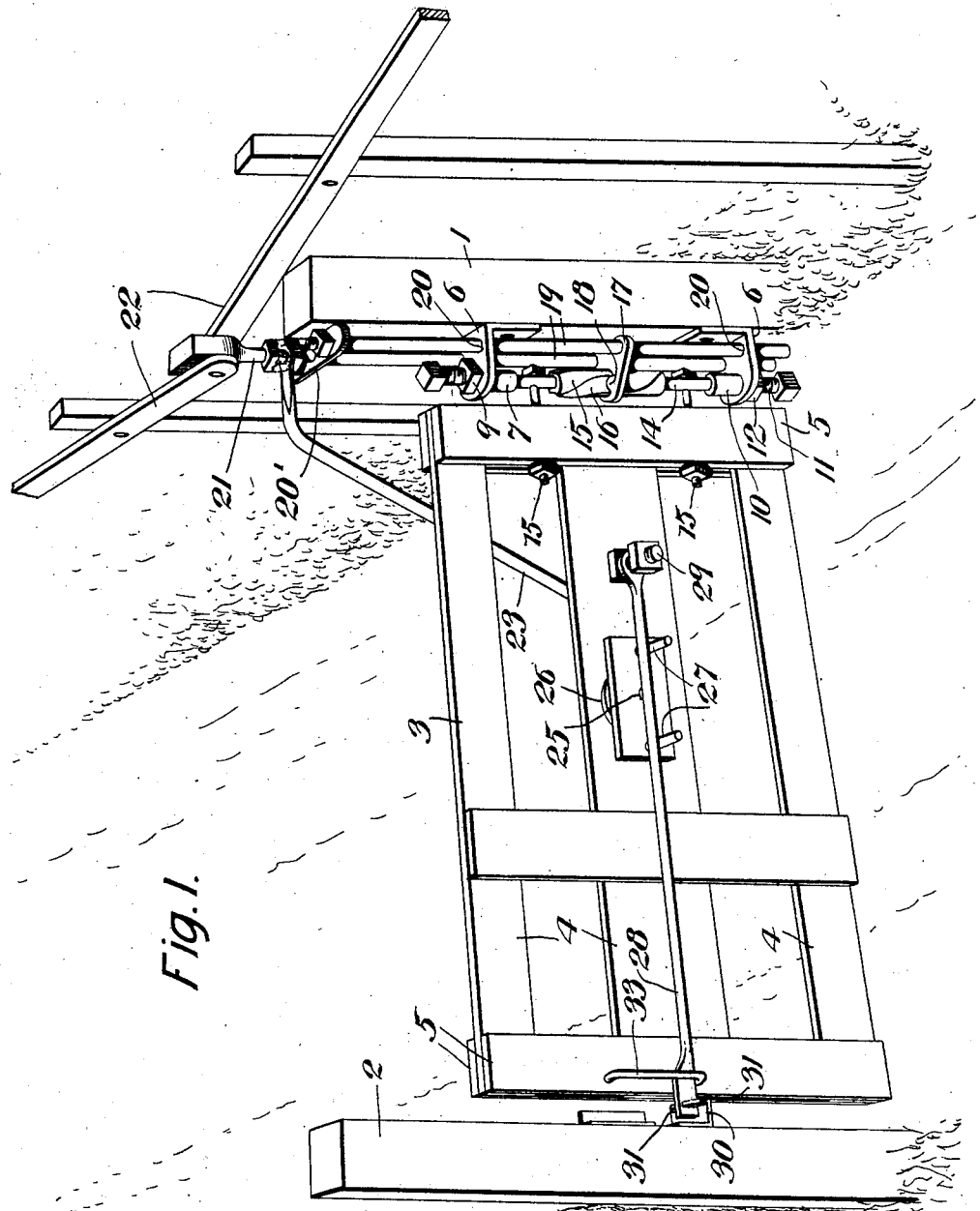

No. 829,466. PATENTED AUG. 28, 1906.
J. M. GILBERT.
GATE.
APPLICATION FILED OCT. 12, 1905.

2 SHEETS—SHEET 1.

Witnesses
Geo. Hilton
C. H. Griesbauer

Inventor
J. M. Gilbert,
by H. B. Wilson
Attorney

No. 829,466. PATENTED AUG. 28, 1906.
J. M. GILBERT.
GATE.
APPLICATION FILED OCT. 12, 1905.
2 SHEETS—SHEET 2.
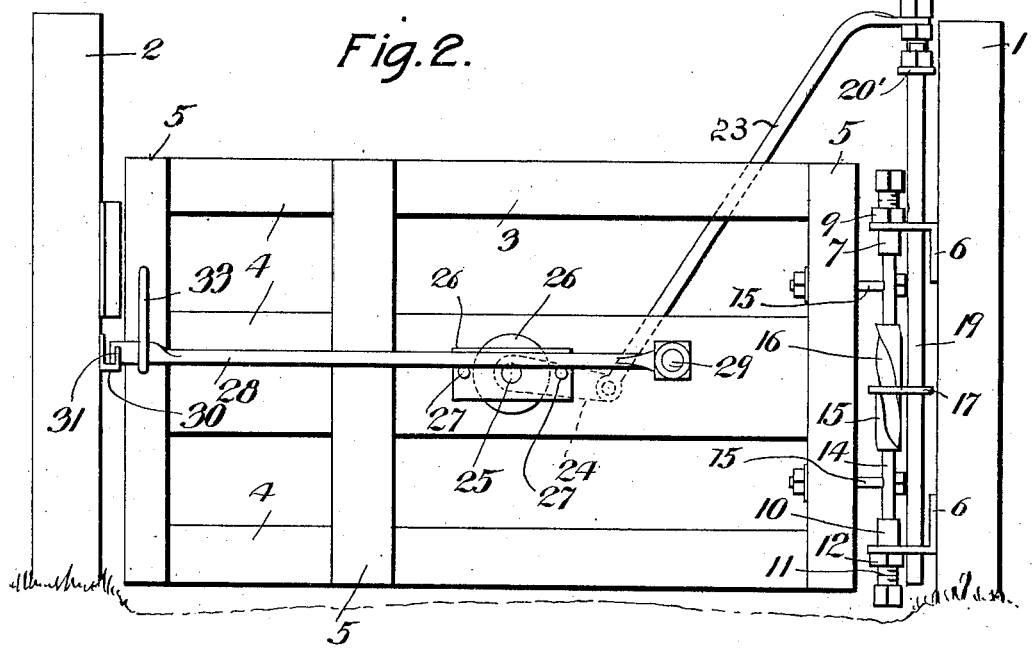
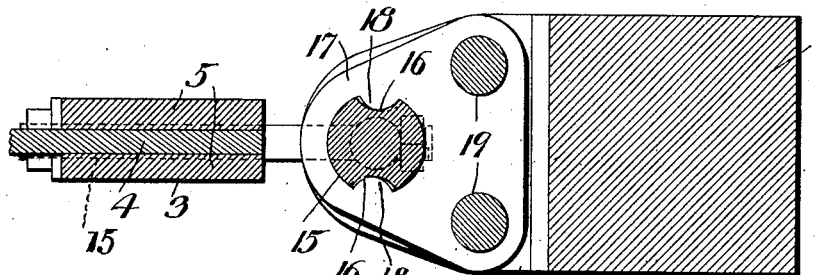
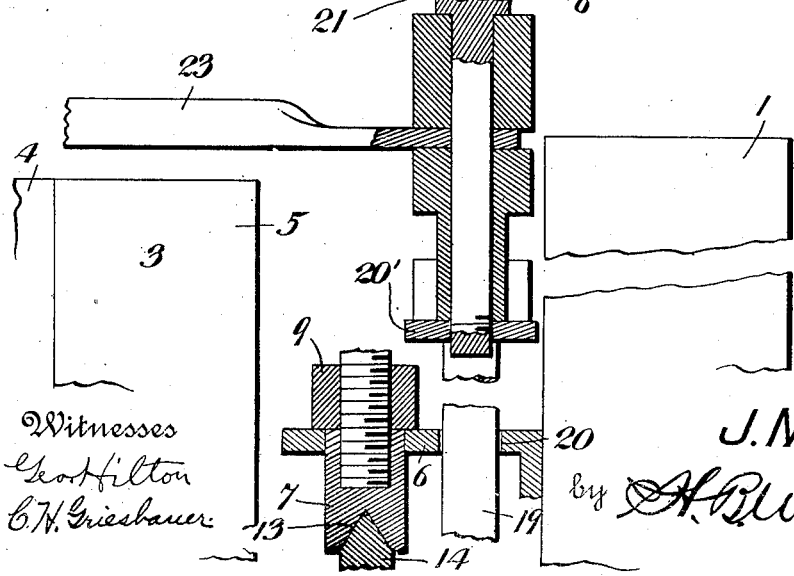
Witnesses
Geo H Hilton
C. H. Griesbauer
Inventor
J. M. Gilbert,
by H. B. Willson
Attorney

UNITED STATES PATENT OFFICE.

JAMES MADISON GILBERT, OF DALLAS, TEXAS.

GATE.

No. 829,466.

Specification of Letters Patent.

Patented Aug. 28, 1906.

Application filed October 12, 1905. Serial No. 282,490.

*To all whom it may concern:*

Be it known that I, JAMES MADISON GILBERT, a citizen of the United States, residing at Dallas, in the county of Dallas and State of Texas, have invented certain new and useful Improvements in Gates; and I do declare the following to be a full, clear, and exact description of the invention, such as will enable others skilled in the art to which it appertains to make and use the same.

This invention relates to gates; and one of the principal objects of the same is to provide a gate which may be opened either outward or inward by the occupants of a vehicle upon approaching the same without the necessity of alighting from the vehicle, means being provided whereby the latch for securing the gate in a closed position will be released by the initial movement of the gate-operating mechanism.

With the above and other objects in view the invention consists of certain novel features of construction, combination, and arrangement of parts, as will be hereinafter described and claimed.

In the accompanying drawings, Figure 1 is a perspective view of a gate constructed in accordance with my invention, the gate being shown in closed position. Fig. 2 is a side elevation of the gate and its operating mechanism, parts of the latter being shown in vertical section. Fig. 3 is a detail horizontal section of the gate, the operating mechanism, and the hinge-post; and Fig. 4 is a detail vertical sectional view through the upper end of the gate-operating mechanism and the supporting-bracket of the same and taken at right angles to the section shown in Fig. 2.

Referring to the drawings for a more particular description of my invention, the numeral 1 designates the hinge-post, and 2 the latch-post, of the gate. The gate 3 may be of any suitable construction, but is here shown as consisting of longitudinal horizontally-disposed bars 4, connected at their ends by the upright bars 5. Bolted to the hinge-post 1 are a pair of laterally-projecting brackets 6. In the upper supporting-bracket is secured a vertically-disposed bearing 7, which projects through the bracket and is adjustable therein by means of the bolt and nut 9. In the lower bracket a similar bearing 10 is provided and is also adjustable by means of the bolt 11 and nut 12. These bearings are each provided with a conical recess 13, and mounted between these bearings is a shaft 14, having an enlarged screw portion 15 arranged centrally thereon. The shaft 14 is connected by bolts $15^\times$ to the gate. The screw 15 is provided with two spirally-arranged grooves 16. A collar 17 is provided with lugs 18, which project into the grooves 16, and said collar is mounted to be moved vertically to swing the gate in either direction by rods 19, said rods passing through openings 20 in the brackets 6. Connected to the upper ends of the rods 19 is a cross-bar 20', and secured to the said cross-bar is a bearing-block 21, to which the levers 22 are connected. Connected to the bearing-block 21 is a connecting-rod 23, extending in an inclined direction downward and having its lower end pivotally connected to a crank 24, said crank being mounted upon a shaft 25, which passes through a longitudinal bar of the gate. Upon the opposite end of said shaft a disk 26 and a plate $26^\times$ are mounted and at the opposite ends of said plate pins 27 project outward therefrom.

The latch 28 of the gate is pivoted upon a bolt 29, said latch comprising a long bar or rod which extends over the pins 27, the outer end of said latch-bar being adapted to engage a keeper 30, said keeper being secured to the latch-post 2 and provided with the inclined portions 31. To limit the movement of the latch-bar a bail 33 is secured to one of the uprights 5.

The operation of my invention may be described as follows: To open the gate, one of the levers 22 is pulled downwardly, which movement will draw upwardly upon the operating-rods 19, thus moving the collar and causing the lugs to rotate the sprially-grooved portion, and thus open the gate, the latch being operated by the movement of the connecting-rod, the crank and the plate provided with pins for raising the latch-bar out of the keeper. To swing the gate in the opposite direction, the lever 22 is pushed upwardly. It will thus be obvious that the gate can be swung in either direction outward or inward past the latch-post. However, it will be noted that the latch-bar will always engage the keeper when the gate is in line with said latch-post.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. In a gate, the combination with a hinge-post, of supporting-brackets secured thereon, a spirally-grooved shaft mounted to rotate between said brackets, a collar engaging the grooves in said shaft, operating-rods connected to said collar, levers for moving said operating-rods, a connecting-rod adapted to be moved with said operating-rods, a latch-bar, and means for operating said latch-bar simultaneously with the rotation of the spirally-grooved shaft.

2. In a gate, the combination of a spirally-grooved shaft secured to the gate, and mounted in adjustable bearings, a collar having lugs projecting into the grooves of said shaft, operating-rods connected to said collar, means for raising and lowering the operating-rods and a latch to be moved simultaneously with the swinging of the gate by means substantially as described.

3. In a gate, a spirally-grooved shaft connected to the gate, a collar connected to said grooved shaft by means of lugs projecting into the grooves, sliding rods connected to the collar, a latch, and means connected to the operating-rods for raising the latch out of its keeper at the initial movement in swinging the gate.

4. In a gate of the character described, the combination with a hinge-post and a latch-post, of upper and lower supporting-brackets secured to said hinge-post, upper and lower bearings adjustable within said brackets, a spirally-grooved shaft mounted in said brackets, a collar mounted to slide on said grooved shaft, operating-rods connected to said collar, means for moving said operating-rods, and a latch movable by connections between the operating-rods and the latch, substantially as described.

5. In a gate, a spirally-grooved shaft connected to said gate, reciprocating rods carrying a collar for rotating said grooved shaft, means for reciprocating said rods, and a latch adapted to be raised out of its keeper by the initial movement of said rods, substantially as described.

In testimony whereof I have hereunto set my hand in presence of two subscribing witnesses.

JAMES MADISON GILBERT.

Witnesses:
    J. H. NEALE,
    R. B. SCOTT.